US011061966B2

(12) United States Patent
Huang (10) Patent No.: US 11,061,966 B2
(45) Date of Patent: Jul. 13, 2021

(54) METHOD FOR PROCESSING FUSION DATA AND INFORMATION RECOMMENDATION SYSTEM (71) Applicant: Guangdong Oppo Mobile Telecommunications Corp., Ltd., Guangdong (CN)

(72) Inventor: Shudong Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 395 days.

(21) Appl. No.: 16/173,494

(22) Filed: Oct. 29, 2018

(65) Prior Publication Data
US 2019/0205477 A1 Jul. 4, 2019

(30) Foreign Application Priority Data

Dec. 29, 2017 (CN) .......................... 201711468874.X (51) Int. Cl.
*G06F 16/00* (2019.01)
*G06F 16/901* (2019.01)
(Continued)

(52) U.S. Cl.
CPC .......... *G06F 16/901* (2019.01); *G06F 16/951* (2019.01); *G06F 16/9535* (2019.01);
(Continued)

(58) Field of Classification Search
CPC .............. G06F 16/901; G06F 16/9535; G06F 16/9536; G06F 16/951; G06F 16/2465;
(Continued)

(56) References Cited

U.S. PATENT DOCUMENTS 9,652,797 B2 * 5/2017 Vijayaraghavan .......................... G06Q 30/0201
2007/0299828 A1 * 12/2007 Lewis .................... G06Q 10/10
(Continued)

FOREIGN PATENT DOCUMENTS

| CN | 102508859 A | 6/2012 |
| CN | 102592235 A | 7/2012 |

(Continued)

OTHER PUBLICATIONS

Li Hong Ge et al: "Low-dimensional feature fusion strategy for overlapping neuron spike sorting", Neurocomputing, Elsevier, Amsterdam, NL, vol. 281, Dec. 7, 2017 (Dec. 7, 2017), pp. 152-159, XP085493262, ISSN: 0925-2312, DOI: 10.1016/J.NEUCOM.2017.12.004 * the whole document *.

(Continued)

*Primary Examiner* — Jared M Bibbee (57) ABSTRACT

A method for processing fusion data and an information recommendation system are provided. The method includes the follows. The information recommendation system obtains a plurality of heterogeneous data sources. The information recommendation system obtains a unified evaluation index of each heterogeneous data source, by processing the plurality of heterogeneous data sources through the value-model set. The information recommendation system obtains a loss quantitative evaluation index of the fusion-strategy model. The information recommendation system obtains a fusion sorting recommendation result of the plurality of heterogeneous data sources, by inputting the unified evaluation index of each heterogeneous data source and the loss quantitative evaluation index to the fusion-strategy model.

20 Claims, 5 Drawing Sheets (51) Int. Cl.
*G06F 16/9535* (2019.01)
*G06F 16/9536* (2019.01)
*G06N 20/00* (2019.01)
*G06F 16/951* (2019.01)
*G06K 9/62* (2006.01)

(52) U.S. Cl.
CPC ......... *G06F 16/9536* (2019.01); *G06K 9/623* (2013.01); *G06K 9/6288* (2013.01); *G06N 20/00* (2019.01)

(58) Field of Classification Search
CPC ...... G06N 20/00; G06K 9/623; G06K 9/6288; G06Q 30/0251
See application file for complete search history.

(56) References Cited

U.S. PATENT DOCUMENTS

| | | | |
|---|---|---|---|
| 2009/0006368 | A1 | 1/2009 | Mei et al. |
| 2012/0215735 | A1* | 8/2012 | Abielmona ............ G06N 7/005 706/52 |
| 2015/0039634 | A1* | 2/2015 | Mo .................... G06F 16/9535 707/754 |
| 2015/0112918 | A1* | 4/2015 | Zheng ................... G06Q 30/02 706/48 |
| 2015/0120722 | A1* | 4/2015 | Mart N Mart Nez ....................... G06F 16/9535 707/733 |

FOREIGN PATENT DOCUMENTS

| | | |
|---|---|---|
| CN | 103995878 A | 8/2014 |
| CN | 105740276 A | 7/2016 |
| CN | 106126727 A | 11/2016 |
| CN | 106445954 A | 2/2017 |
| CN | 106504011 A | 3/2017 |
| CN | 103729386 B | 8/2017 |
| CN | 107122447 A | 9/2017 |
| CN | 107330050 A | 11/2017 |
| CN | 107424043 A | 12/2017 |
| JP | 2012528406 A | 11/2012 |
| JP | 2016177772 A | 10/2016 |
| JP | 2017054257 A | 3/2017 |
| JP | 2017207936 A | 11/2017 |
| WO | 02087431 A1 | 11/2002 |
| WO | 2016201631 A1 | 12/2016 |
| WO | 2017088688 A1 | 6/2017 |
| WO | 2017121258 A1 | 7/2017 |

OTHER PUBLICATIONS

Extended European search report issued in corresponding European application No. 18204342.2 dated Feb. 14, 2019.
International search report issued in corresponding international application No. PCT/CN2018/110668 dated Dec. 29, 2018.
Examination Report issued in corresponding European application No. 18204342.2 dated Feb. 10, 2021.
First Examination Report issued in corresponding IN application No. 201814041354 dated Feb. 11, 2021.
Japanese Office Action with English Translation for JP Application 2020-526448 dated May 21, 2021 (8 pages).

* cited by examiner

METHOD FOR PROCESSING FUSION DATA AND INFORMATION RECOMMENDATION SYSTEM

CROSS-REFERENCE TO RELATED APPLICATION(S)

This application claims priority to Chinese Patent Application No. 201711468874X, filed on Dec. 29, 2017, the content of which is hereby incorporated by reference in its entirety.

TECHNICAL FIELD

This disclosure relates to the technical field of machine learning, and particularly to a method for processing fusion data and an information recommendation system.

BACKGROUND

Shuffling of heterogeneous data sources refers to mixing multiple data sources in a list to achieve different product goals or user experience in displaying and sorting of lists, such as search lists, recommendation lists, and the like. For example, natural results and advertisements are mixed in a search list to meet user experience. As for a product with a list displayed, display positions are limited, and it is a problem how to properly integrate multiple heterogeneous data sources to make global optimization.

SUMMARY

Implementations of the disclosure provide a method for processing fusion data and an information recommendation system.

According to a first aspect of the implementations of the disclosure, a method for processing fusion data is provided. The method for processing fusion data is applicable to an information recommendation system including a value-model set and a fusion-strategy model. The method includes the follows.

Multiple heterogeneous data sources are obtained. A unified evaluation index of each heterogeneous data source of the multiple heterogeneous data sources is obtained by processing the multiple heterogeneous data sources through the value-model set. A loss quantitative evaluation index of the fusion-strategy model is obtained. A fusion sorting recommendation result of the multiple heterogeneous data sources is obtained by inputting the unified evaluation index of the each heterogeneous data source and the loss quantitative evaluation index to the fusion-strategy model.

According to a second aspect of the implementations of the disclosure, an information recommendation system is provided. The information recommendation system includes a processor and a memory configured to store executable program codes, which, when executed, cause the processor to: obtain multiple heterogeneous data sources, obtain a unified evaluation index of each heterogeneous data source, by processing the multiple heterogeneous data sources through the value-model set, obtain a loss quantitative evaluation index of the fusion-strategy model, and obtain a fusion sorting recommendation result of the multiple heterogeneous data sources, by inputting the unified evaluation index of each heterogeneous data source and the loss quantitative evaluation index to the fusion-strategy model.

According to a third aspect of the implementations of the disclosure, a method for processing fusion data is provided. The method for processing fusion data is applicable to an information recommendation system including a first system. The first system includes a value-model set and a fusion-strategy model. The method includes the follows.

The first system obtains multiple heterogeneous data sources. The first system obtains a unified evaluation index of each heterogeneous data source of the multiple heterogeneous data sources, by processing the multiple heterogeneous data sources through the value-model set. The first system obtains a loss quantitative evaluation index of the fusion-strategy model. The first system obtains a fusion sorting recommendation result of the multiple heterogeneous data sources, by inputting the unified evaluation index of each heterogeneous data source and the loss quantitative evaluation index to the fusion-strategy model.

BRIEF DESCRIPTION OF THE DRAWINGS

The following briefly introduces the accompanying drawings required for describing the implementations.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Figure 1A:
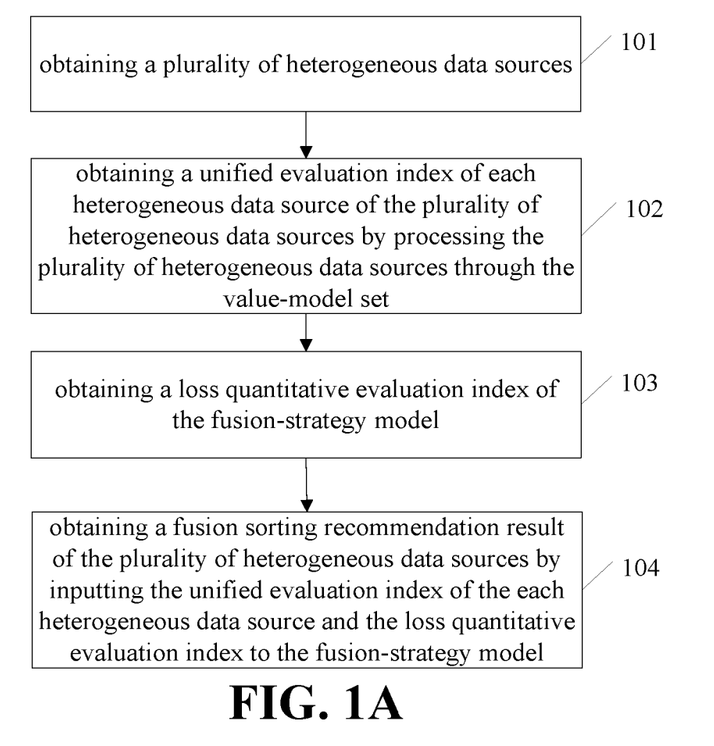
FIG. 1A is a schematic flow chart illustrating a method for processing fusion data according to an implementation of the present disclosure.

FIG. 1A is a schematic flow chart illustrating a method for processing fusion data according to an implementation of the present disclosure. The method is applicable to an information recommendation system. The information recommendation system includes a value-model set and a fusion-strategy model. As illustrated in FIG. 1A, the method begins with operations at block 101.

At block 101, multiple heterogeneous data sources are obtained.

At block 102, a unified evaluation index of each heterogeneous data source of the multiple heterogeneous data sources is obtained by processing the multiple heterogeneous data sources through the value-model set.

At block 103, a loss quantitative evaluation index of the fusion-strategy model is obtained.

At block 104, a fusion sorting recommendation result of the multiple heterogeneous data sources is obtained by inputting the unified evaluation index of the each heterogeneous data source and the loss quantitative evaluation index to the fusion-strategy model.

As can be seen, multiple heterogeneous data sources are obtained, a unified evaluation index of each heterogeneous data source of the multiple heterogeneous data sources is obtained by processing the multiple heterogeneous data sources through the value-model set. A loss quantitative evaluation index of the fusion-strategy model is obtained. A fusion sorting recommendation result of the multiple heterogeneous data sources is obtained by inputting the unified evaluation index of the each heterogeneous data source and the loss quantitative evaluation index to the fusion-strategy model. In this way, multiple data sources can be aligned via a value model and a fusion sorting is conducted with aid of the fusion-strategy model, which can effectively achieve the global optimal fusion sorting of the multiple heterogeneous data under constraints.

In an implementation, the unified evaluation index of each heterogeneous data source of the multiple heterogeneous data sources can be obtained by processing the multiple heterogeneous data sources through the value-model set as follows.

A value model corresponding to the each heterogeneous data source is obtained by inquiring the value-model set. The value-model set includes a correspondence between data types of heterogeneous data sources and value models. Feature parameters required by the value model corresponding to the each heterogeneous data source are obtained. A dedicated predictor associated with the value model corresponding to the each heterogeneous data source is determined. The unified evaluation index of the each heterogeneous data source is obtained by inputting the feature parameters and the value model of the each heterogeneous data source into the dedicated predictor.

In an implementation, the loss quantitative evaluation index of the fusion-strategy model is obtained as follows.

An estimated prior result of processing a preset recommendation task through the fusion-strategy model is obtained. An actual posterior result of processing the preset recommendation task by the fusion-strategy model is obtained. The loss quantitative evaluation index of the fusion-strategy model is determined according to the estimated prior result and the actual posterior result.

It is to be understood that, "estimated prior result" refers to a description of what is likely to happen in the future based on the information that you have now and the goal thereof is often most useful to generate a range of possible results that is precise enough to be useful even if input data may be incomplete, uncertain, or unstable. In one implementation, the estimated prior result can be a result produced depending on the predictor, the feature parameters, and the target model.

It is to be understood that, "actual posterior result" refers to a piece of information that is known to be true after taking into account the relevant evidence related to the particular case being examined. In one implementation, the actual posterior result can be a ratio of the number of users feeding back interaction to the number of user actually recommended.

In an implementation, the estimated prior result of processing the preset recommendation task through the fusion-strategy model is obtained as follows.

Feature parameters required by the fusion-strategy model to process the preset recommendation task are obtained. The estimated prior result of processing the preset recommendation task through the fusion-strategy model is obtained, by inputting the feature parameters and the fusion-strategy model into a preset predictor.

In an implementation, the fusion sorting recommendation result of the multiple heterogeneous data sources is obtained by inputting the unified evaluation index of the each heterogeneous data source and the loss quantitative evaluation index to the fusion-strategy model as follows.

A sorting set is generated according to the unified evaluation index of the each heterogeneous data source. The sorting set includes multiple data resource sequences, each data resource sequence includes the multiple heterogeneous data sources, and heterogeneous data sources in one data resource sequence have an order different from that of heterogeneous data sources in another data resource sequence.

An optimum sorting is selected from the sorting set as the fusion sorting recommendation result of the multiple heterogeneous data sources under a constraint of the fusion-strategy model.

In an implementation, the constraint includes at least one of the following: there is at least one natural result in recommendation results, the number of advertisements cannot be less than a preset number, recommendation information cannot be all unpopular information or cannot be all popular information, and a ratio of displayed natural results to all data sources in a time period is greater than a preset ratio.

In an implementation, the information recommendation system further includes a training database and multiple value modules. The information recommendation system is configured to train each value model via training data in the training database to obtain trained value models. The method further includes the follows.

The trained value models and data types corresponding to the trained value models are obtained.

The value-model set is generated according to the trained value models obtained and the corresponding data types.

It should be noted that, the method for processing fusion data illustrated in FIG. 1A is applicable to an information recommendation system.

As an implementation, the information recommendation system includes a first system and a second system, where the first system can be cloud computing resources or a server cluster and the second system can be a server cluster. Operations of the method for training a model illustrated in FIG. 1A can be conducted by at least one of: the first system, the second system, and the system and the second system, which is not limited herein.

Figure 1B:
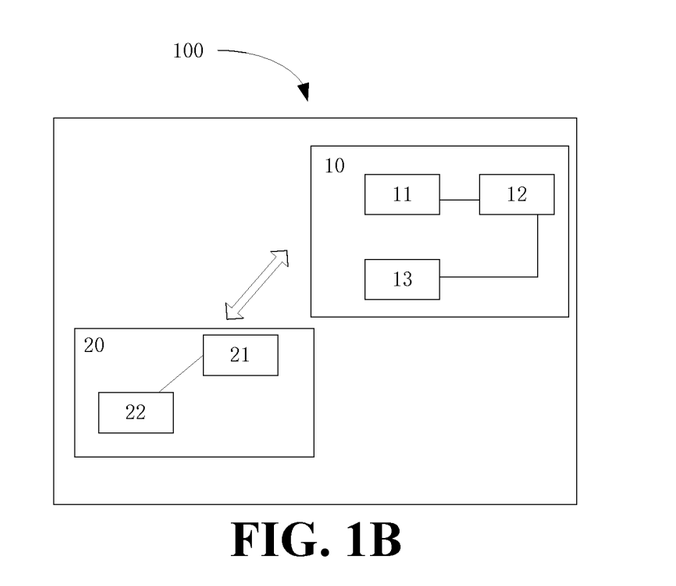
FIG. 1B is a system architecture of an information recommendation system according to an implementation of the present disclosure.

FIG. 1B is a system architecture of an information recommendation system 100 according to an implementation of the present disclosure. The information recommendation system 100 may take the physical form of a server cluster and/or cloud computing resources, which is not limited herein. The information recommendation system 100 includes a first system 10. The first system 10 can be cloud computing resources or a server cluster. The first system 10 includes a value-model set 11, a fusion-strategy model 12 and a predictor 13. The value-model set 11 and the fusion-strategy model 12 are configured to process a real-time online recommendation task. The predictor 13 is configured to generate an estimated prior result in conjunction with the fusion-strategy model 12 and feature parameters associated with the recommendation task.

In an implementation, the information recommendation system 100 can further include a second system 20. The second system 20 can be a server cluster. The first system 10 can be cloud computing resources or a server cluster. The second system 20 includes a training database 21 and multiple value modules 22. The second system 20 is configured to periodically train the multiple value modules 22 by using training data in the training database 21 to obtain the trained target value modules 11, and to push the trained value modules 11 to the first system 10 for use.

As an implementation, the first system 10 can refer to an online system, and the second system 10 can refer to an offline system.

In general design, there are mainly two kinds of fusion sorting.

1. Fixed-location sorting. For example, in a search results page, there are two kinds of data sources, that is, advertisements and natural results. The first few data sources are fixed advertisement and the other data source locations are natural results. The fixed-location sorting cannot achieve individuation and global optimization.

2. Manual-rule location allocation. Allocate different data source locations dynamically through manual intervention. For example, if some users are disgusted with advertisements, then reduce the advertisement presented to the user in the search results page; otherwise, increase the advertisements presented. Compared with the fixed-location sorting, manual-rule dynamic location allocation has some advantages, however, it relies on personal experience and can only involve a few dimensions and therefore, it is hard to achieve fine-control and global optimization.

In view of the above, a method for processing fusion data is provided in implementations of the disclosure. In this method, the first system first obtains multiple heterogeneous data sources, and then the first system obtains a unified evaluation index of each heterogeneous data source by processing the multiple heterogeneous data sources through the value-model set. Thereafter, the first system obtains a loss quantitative evaluation index of the fusion-strategy model. At last, the first system obtains a fusion sorting recommendation result of the multiple heterogeneous data sources by inputting the unified evaluation index of each heterogeneous data source and the loss quantitative evaluation index to the fusion-strategy model. The first system can align multiple data sources via a value model and conduct a fusion sorting with aid of the fusion-strategy model, which can effectively achieve the global optimal fusion sorting of the multiple heterogeneous data under constraints.

The following describes the implementations of the disclosure in conjunction with the accompanying drawings.

Figure 2:
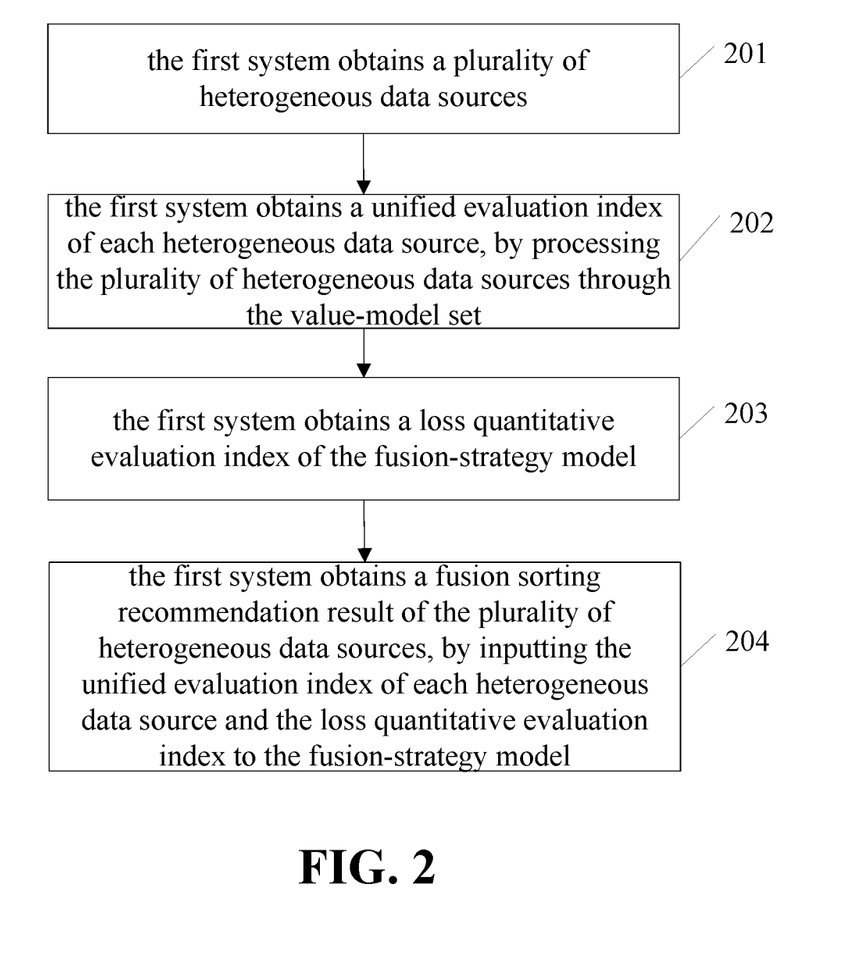
FIG. 2 is a schematic flow chart illustrating a method for processing fusion data according to an implementation of the present disclosure.

FIG. 2 is a schematic flow chart illustrating a method for processing fusion data according to an implementation of the present disclosure. The method is applicable to an information recommendation system. The information recommendation system includes a first system. The first system includes a value-model set and a fusion-strategy model. As illustrated in FIG. 2, the method begins with operations at block 201.

At block 201, the first system obtains multiple heterogeneous data sources.

The heterogeneous data sources (that is, disparate data sources) include images, webpage icons, webpage frames, and the like.

Broadly defined, the heterogeneous data sources refer to multiple data sources with at least one of: different data structures, access methods, or forms.

At block 202, the first system obtains a unified evaluation index of each heterogeneous data source of the multiple heterogeneous data sources, by processing the multiple heterogeneous data sources through the value-model set.

The value-model set includes multiple value models. The multiple value models can be trained by the second system according to sample data.

At block 203, the first system obtains a loss quantitative evaluation index of the fusion-strategy model.

The loss quantitative evaluation index is configured to evaluate predictive quality of the fusion-strategy model.

At block 204, the first system obtains a fusion sorting recommendation result of the multiple heterogeneous data sources, by inputting the unified evaluation index of each heterogeneous data source and the loss quantitative evaluation index to the fusion-strategy model.

As can be seen, according to the implementations of the disclosure, the first system first obtains the multiple heterogeneous data sources, and then the first system obtains the unified evaluation index of each heterogeneous data source by processing the multiple heterogeneous data sources through the value-model set. Thereafter, the first system obtains the loss quantitative evaluation index of the fusion-strategy model. At last, the first system obtains the fusion sorting recommendation result of the multiple heterogeneous data sources by inputting the unified evaluation index of each heterogeneous data source and the loss quantitative evaluation index to the fusion-strategy model. The first system can align multiple data sources via a value model and conduct a fusion sorting with aid of the fusion-strategy model, which can effectively achieve the global optimal fusion sorting of the multiple heterogeneous data under constraints.

In one implementation, the first system obtains the unified evaluation index of each heterogeneous data source by processing the multiple heterogeneous data sources through the value-model set as follows.

The first system obtains a value model corresponding to each heterogeneous data source by inquiring the value-model set, where the value-model set includes a correspondence between data types of heterogeneous data sources and value models. The first system obtains feature parameters required by the value model corresponding to each heterogeneous data source. The first system determines a dedicated predictor associated with the value model corresponding to each heterogeneous data source. The first system obtains the unified evaluation index of each heterogeneous data source, by inputting the feature parameters and the value model of each heterogeneous data source into the dedicated predictor.

The dedicated predictor can be associated with specific user level or further associated with specific user-scenario level to achieve dedicated estimation, thus has a high accuracy.

As can be seen, in this implementation, for each heterogeneous data source, the first system can find a corresponding dedicated predictor and determine the unified evaluation index of each heterogeneous data source by using the dedicated predictor. As the dedicated predictor is a preset tool with a high accuracy and stable calculation, accuracy and stability of the unified evaluation index determined can be improved.

In one implementation, the information recommendation system further includes the second system. The first system obtains the loss quantitative evaluation index of the fusion-strategy model as follows.

The first system obtains an estimated prior result of processing a preset recommendation task by the fusion-strategy model. The first system receives from the second system an actual posterior result of processing the preset recommendation task through the fusion-strategy model. The first system determines the loss quantitative evaluation index of the fusion-strategy model according to the estimated prior result and the actual posterior result.

The preset recommendation task is a recommendation task for target items to be recommended. For example, in a browser application scenario, if an advertisement needs to be pushed when the first system pushes news, a recommendation task for the advertisement will be generated.

As can be seen, in this implementation, the loss quantitative evaluation index of the fusion-strategy model is determined based on the estimated prior result and the actual posterior result, thus consistent with usage habits of actual user groups and has high accuracy.

In one implementation, the first system obtains the estimated prior result of processing the preset recommendation task by the fusion-strategy model as follows.

The first system obtains feature parameters required by the fusion-strategy model to process the preset recommendation task. The first system obtains the estimated prior result of processing the preset recommendation task by the fusion-strategy model, by inputting the feature parameters and the fusion-strategy model into a preset predictor.

The feature parameters include user portrait information (such as preferences, interests, geographic locations, etc.), information of items to be recommended (such as keywords, categories, etc.), and scenario information (such as holidays, travel, etc.). The actual posterior result may be a ratio of the number of users conducting interactive feedback to a total number of users recommended.

For example, if the item to be recommended of the target recommendation task is recommended to one hundred users, ten of whom click "yes", then the actual posterior result of the target recommendation task is 10/100, that is 0.1.

In this implementation, the estimated prior result can be obtained by the predictor of the first system and there is no need to build a calculation model in real time for estimation. As a result, high calculation efficiency and accuracy can be obtained.

In one implementation, the first system obtains the fusion sorting recommendation result of the multiple heterogeneous data sources by inputting the unified evaluation index of each heterogeneous data source and the loss quantitative evaluation index to the fusion-strategy model as follows.

The first system generates a sorting set according to the unified evaluation index of each heterogeneous data source. The sorting set includes multiple data resource sequences and each data resource sequence includes the multiple heterogeneous data sources. Heterogeneous data sources in one data resource sequence have an order different from that of heterogeneous data sources in another data resource sequence. The first system selects an optimum sorting from the sorting set as the fusion sorting recommendation result of the multiple heterogeneous data sources under a constraint of the fusion-strategy model.

The fusion-strategy model includes a constraint(s) and a location-competition control strategy. The constraint can be, for example, any one of the following: there is at least one natural result in recommendation results, the number of advertisements cannot be less than a preset number, recommendation information cannot be all unpopular information or cannot be all popular information, a ratio of displayed natural results to all data sources in a time period is greater than a preset ratio, and the like.

The optimum sorting selected from the sorting set can refer to a sorting(s) that meets the constraint of the fusion-strategy model.

As can be seen, in this implementation, the first system uses the fusion-strategy model to select an optimum data resource sequence from multiple alternative data resource sequences under a preset constraint, which can improve selection accuracy.

In one implementation, the information recommendation system further includes a second system including a training database and multiple value modules. The second system is configured to train each value model via training data in the training database to obtain trained value models. The method further includes the follows.

The first system receives the trained value models and data types corresponding to the trained value models from the second system. The first system generates the value-model set according to the trained value models received and the corresponding data types.

As can be seen, in this implementation, the second system can update the value models and push the updated value models to the first system for use, which can improve stability of the information recommendation system.

Figure 3:
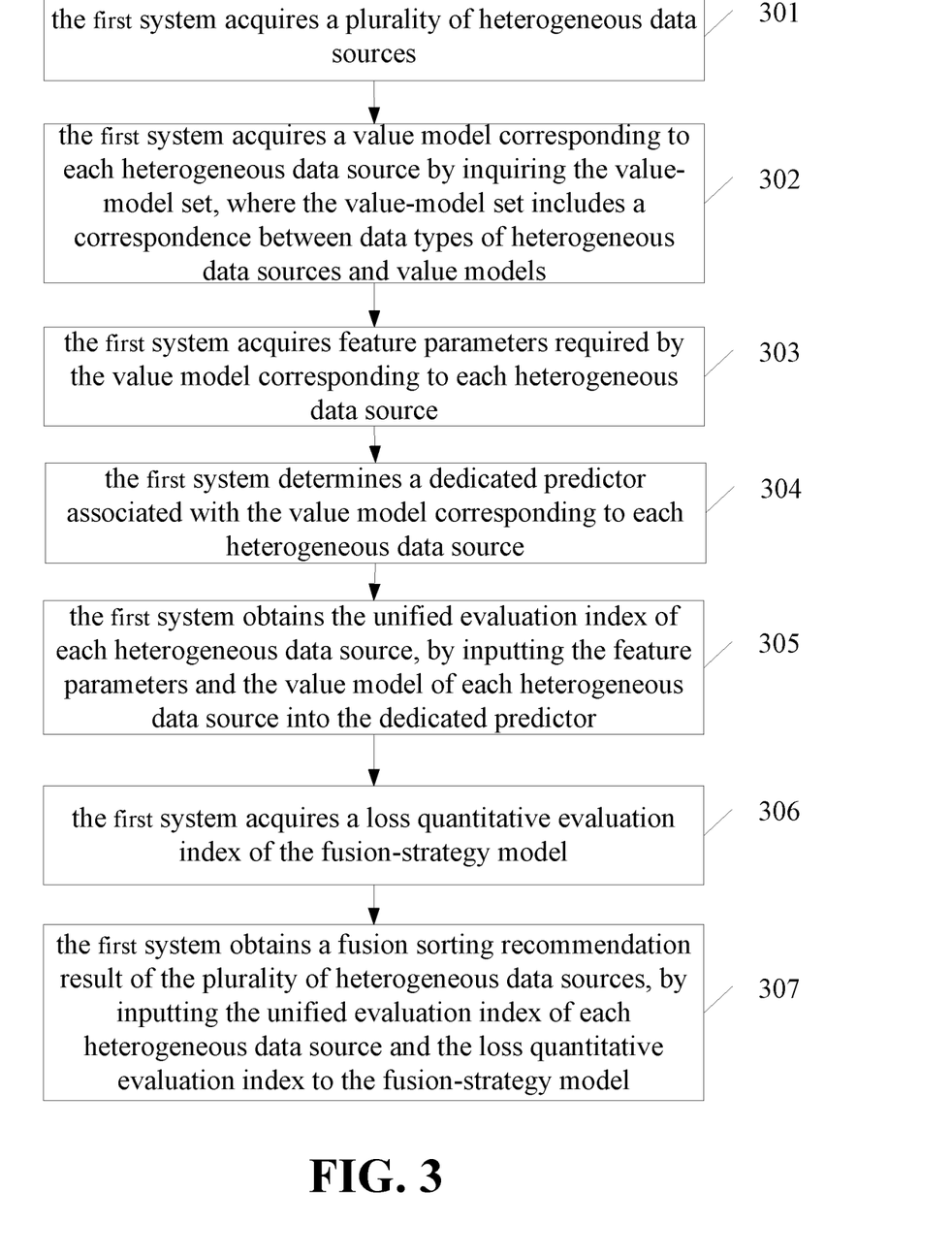
FIG. 3 is a schematic flow chart illustrating a method for processing fusion data according to an implementation of the present disclosure.

Consistent with the implementations illustrated in FIG. 2, FIG. 3 is a schematic flow chart illustrating a method for processing fusion data according to an implementation of the present disclosure. The method is applicable to an information recommendation system. The information recommendation system includes a first system. The first system includes a value-model set and a fusion-strategy model. As illustrated in FIG. 3, the method begins with operations at block 301.

At block 301, the first system obtains multiple heterogeneous data sources.

At block 302, the first system obtains a value model corresponding to each heterogeneous data source by inquiring the value-model set, where the value-model set includes a correspondence between data types of heterogeneous data sources and value models.

At block 303, the first system obtains feature parameters required by the value model corresponding to each heterogeneous data source.

At block 304, the first system determines a dedicated predictor associated with the value model corresponding to each heterogeneous data source.

At block 305, the first system obtains the unified evaluation index of each heterogeneous data source, by inputting the feature parameters and the value model of each heterogeneous data source into the dedicated predictor.

At block 306, the first system obtains a loss quantitative evaluation index of the fusion-strategy model.

At block 307, the first system obtains a fusion sorting recommendation result of the multiple heterogeneous data sources, by inputting the unified evaluation index of each heterogeneous data source and the loss quantitative evaluation index to the fusion-strategy model.

As can be seen, according to the implementations of the disclosure, the first system first obtains the multiple heterogeneous data sources, and then the first system obtains the unified evaluation index of each heterogeneous data source by processing the multiple heterogeneous data sources through the value-model set. Thereafter, the first system obtains the loss quantitative evaluation index of the fusion-strategy model. At last, the first system obtains the fusion sorting recommendation result of the multiple heterogeneous data sources by inputting the unified evaluation index of each heterogeneous data source and the loss quantitative evaluation index to the fusion-strategy model. The first system can align multiple data sources via a value model and conduct a fusion sorting with aid of the fusion-strategy model, which can effectively achieve the global optimal fusion sorting of the multiple heterogeneous data under constraints.

In addition, for each heterogeneous data source, the first system can find a corresponding dedicated predictor, and determine the unified evaluation index of each heterogeneous data source by using the dedicated predictor. As the dedicated predictor is a preset tool with a high accuracy and stable calculation, accuracy and stability of the unified evaluation index determined can be improved.

Figure 4:
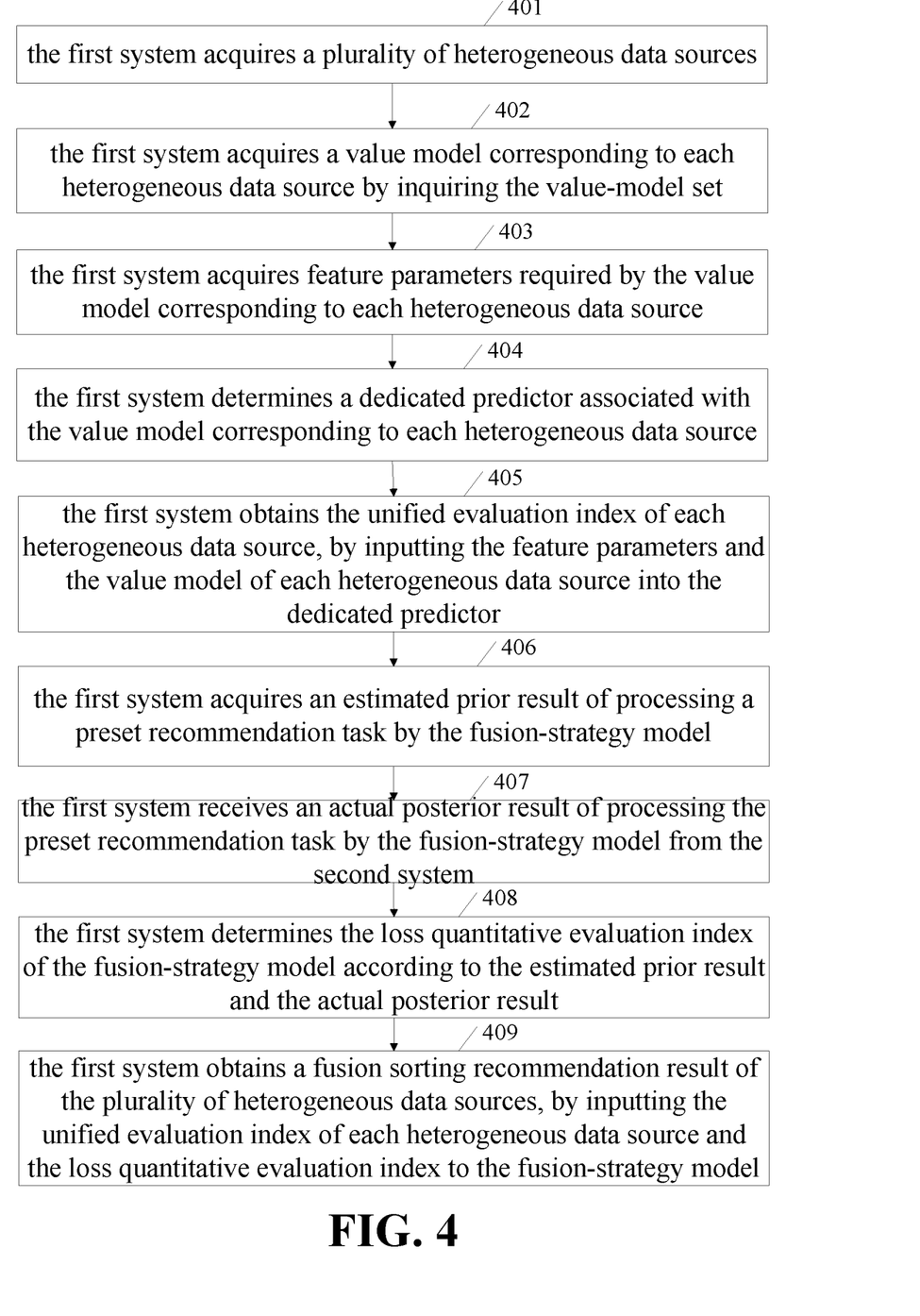
FIG. 4 is a schematic flow chart illustrating a method for processing fusion data according to an implementation of the present disclosure.

Consistent with the implementations illustrated in FIG. 2, FIG. 4 is a schematic flow chart illustrating a method for processing fusion data according to an implementation of the present disclosure. The method is applicable to an information recommendation system. The information recommendation system includes a first system. The first system includes a value-model set and a fusion-strategy model. As illustrated in FIG. 4, the method begins with operations at block 401.

At block 401, the first system obtains multiple heterogeneous data sources.

At block 402, the first system obtains a value model corresponding to each heterogeneous data source by inquiring the value-model set, where the value-model set includes a correspondence between data types of heterogeneous data sources and value models.

At block 403, the first system obtains feature parameters required by the value model corresponding to each heterogeneous data source.

At block 404, the first system determines a dedicated predictor associated with the value model corresponding to each heterogeneous data source.

At block 405, the first system obtains the unified evaluation index of each heterogeneous data source, by inputting the feature parameters and the value model of each heterogeneous data source into the dedicated predictor.

At block 406, the first system obtains an estimated prior result of processing a preset recommendation task by the fusion-strategy model.

At block 407, the first system receives an actual posterior result of processing the preset recommendation task by the fusion-strategy model from the second system.

At block 408, the first system determines the loss quantitative evaluation index of the fusion-strategy model according to the estimated prior result and the actual posterior result.

At block 409, the first system obtains a fusion sorting recommendation result of the multiple heterogeneous data sources, by inputting the unified evaluation index of each heterogeneous data source and the loss quantitative evaluation index to the fusion-strategy model.

As can be seen, according to the implementations of the disclosure, the first system first obtains the multiple heterogeneous data sources, and then the first system obtains the unified evaluation index of each heterogeneous data source by processing the multiple heterogeneous data sources through the value-model set. Thereafter, the first system obtains the loss quantitative evaluation index of the fusion-strategy model. At last, the first system obtains a fusion sorting recommendation result of the multiple heterogeneous data sources by inputting the unified evaluation index of each heterogeneous data source and the loss quantitative evaluation index to the fusion-strategy model. The first system can align multiple data sources via a value model and conduct a fusion sorting with aid of the fusion-strategy model, which can effectively achieve the global optimal fusion sorting of the multiple heterogeneous data under constraints.

In addition, for each heterogeneous data source, the first system can find a corresponding dedicated predictor, and determine the unified evaluation index of each heterogeneous data source by using the dedicated predictor. As the dedicated predictor is a preset tool with a high accuracy and stable calculation, accuracy and stability of the unified evaluation index determined can be improved.

Moreover, loss quantitative evaluation index of the fusion-strategy model is determined based on the estimated prior result and the actual posterior result, thus consistent with usage habits of actual user groups and has high accuracy.

Furthermore, the estimated prior result can be obtained by the predictor of the first system and there is no need to build a calculation model in real time for estimation. As a result, high calculation efficiency and accuracy can be obtained.

Furthermore, the first system selects uses the fusion-strategy mode to select an optimum data resource sequence from multiple alternative data resource sequences under a preset constraint, which can improve selection accuracy.

Figure 5:
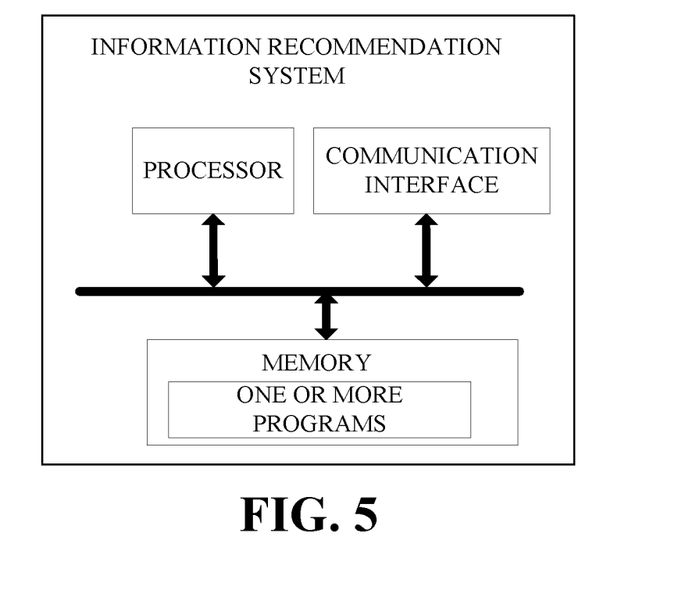
FIG. 5 is a schematic structural diagram illustrating an information recommendation system according to an implementation of the present disclosure.

Consistent with the implementations illustrated in FIG. 2 to FIG. 4, FIG. 5 is a schematic structural diagram illustrating an information recommendation system according to an implementation of the present disclosure. At least one application and an operating system run on the information recommendation system. As illustrated in FIG. 5, the information recommendation system includes a processor, a memory, a communication interface, and one or more programs. The memory is configured to store the one or more programs which are different from the foregoing at least one application. The one or more programs are configured to be executed by the processor and include instructions operable to execute the following operations.

Multiple heterogeneous data sources are obtained. A unified evaluation index of each heterogeneous data source is obtained, by processing the multiple heterogeneous data sources through the value-model set. A loss quantitative evaluation index of the fusion-strategy model is obtained. A fusion sorting recommendation result of the multiple heterogeneous data sources is obtained, by inputting the unified evaluation index of each heterogeneous data source and the loss quantitative evaluation index to the fusion-strategy model.

As can be seen, according to the implementations of the disclosure, the multiple heterogeneous data sources are obtained, and then the unified evaluation index of each heterogeneous data source of the multiple heterogeneous data sources is obtained by processing the multiple heterogeneous data sources through the value-model set. Thereafter, the loss quantitative evaluation index of the fusion-strategy model is obtained. At last, the fusion sorting recommendation result of the multiple heterogeneous data sources is obtained by inputting the unified evaluation index of the each heterogeneous data source and the loss quantitative evaluation index to the fusion-strategy model. The information recommendation system can align multiple data sources via a value model and conduct a fusion sorting with aid of the fusion-strategy model, which can effectively achieve the global optimal fusion sorting of the multiple heterogeneous data under constraints.

In one implementation, in terms of the obtaining a unified evaluation index of each heterogeneous data source, by processing the multiple heterogeneous data sources through the value-model set, the instructions of the programs are operable to execute the following.

A value model corresponding to each heterogeneous data source is obtained, by inquiring the value-model set, where the value-model set includes a correspondence between data types of heterogeneous data sources and value models. Feature parameters required by the value model corresponding to each heterogeneous data source are obtained. A dedicated predictor associated with the value model corresponding to each heterogeneous data source is determined. The unified evaluation index of each heterogeneous data source is obtained, by inputting the feature parameters and the value model of each heterogeneous data source into the dedicated predictor.

In one implementation, in terms of the obtaining a loss quantitative evaluation index of the fusion-strategy model, the instructions of the programs are operable to execute the following.

An estimated prior result of processing a preset recommendation task by the fusion-strategy model is obtained. An actual posterior result of processing the preset recommendation task by the fusion-strategy model is obtained. The loss quantitative evaluation index of the fusion-strategy model is determined according to the estimated prior result and the actual posterior result.

In one implementation, in terms of the obtaining an estimated prior result of processing a preset recommendation task by the fusion-strategy model, the instructions of the programs are operable to execute the following.

Feature parameters required by the fusion-strategy model to process the preset recommendation task are obtained. The estimated prior result of processing the preset recommendation task by the fusion-strategy model is obtained, by inputting the feature parameters and the fusion-strategy model into a preset predictor.

In one implementation, in terms of the obtaining a fusion sorting recommendation result of the multiple heterogeneous data sources, by inputting the unified evaluation index of each heterogeneous data source and the loss quantitative evaluation index to the fusion-strategy model, the instructions of the programs are operable to execute the following.

A sorting set according to the unified evaluation index of each heterogeneous data source is generated, where the sorting set includes multiple data resource sequences, each data resource sequence includes the multiple heterogeneous data sources, and heterogeneous data sources in one data resource sequence has an order different from that of heterogeneous data sources in another data resource sequence. An optimum sorting is selected from the sorting set as the fusion sorting recommendation result of the multiple heterogeneous data sources under a constraint of the fusion-strategy model.

In one implementation, the information recommendation system further includes a training database and multiple value modules, and the information recommendation system is configured to train each value model via training data in the training database to obtain trained value models. The programs further include instructions operable to execute the following operations.

The trained value models and data types corresponding to the trained value models are obtained. The value-model set is generated according to the trained value models obtained and the corresponding data types.

Figure 6:
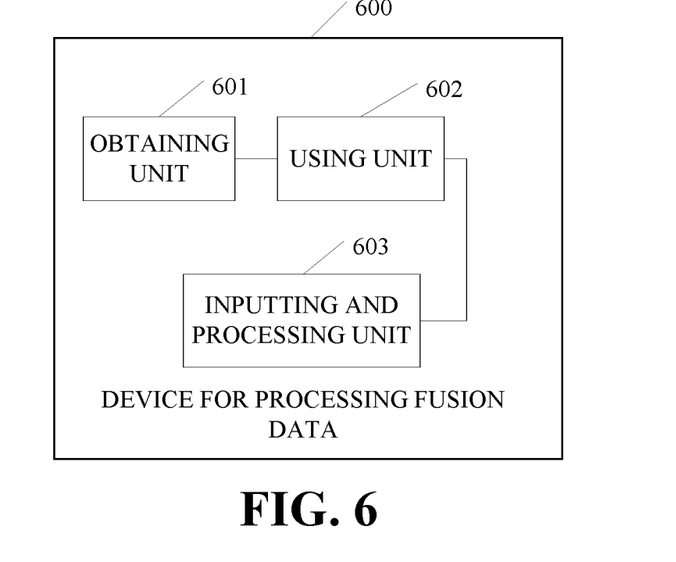
FIG. 6 is a block diagram illustrating functional units of a device for processing fusion data according to an implementation of the present disclosure.

FIG. 6 is a block diagram illustrating functional units of a device for processing fusion data according to an implementation of the present disclosure. The device for processing fusion data 600 is applicable to an information recommendation system. The information recommendation system includes a first system. The first system includes a value-model set and a fusion-strategy model. The device for processing fusion data includes an obtaining unit 601, a using unit 602, and an inputting and processing unit 603.

The obtaining unit 601 is configured to obtain multiple heterogeneous data sources.

The using unit 602 is configured to obtain a unified evaluation index of each heterogeneous data source, by processing the multiple heterogeneous data sources through the value-model set.

The obtaining unit 601 is further configured to obtain a loss quantitative evaluation index of the fusion-strategy model.

The inputting and processing unit 603 is configured to obtain a fusion sorting recommendation result of the multiple heterogeneous data sources, by inputting the unified evaluation index of each heterogeneous data source and the loss quantitative evaluation index to the fusion-strategy model.

As can be seen, according to the implementations of the disclosure, the first system first obtains multiple heterogeneous data sources, and then the first system obtains a unified evaluation index of each heterogeneous data source by processing the multiple heterogeneous data sources through the value-model set. Thereafter, the first system obtains a loss quantitative evaluation index of the fusion-strategy model. At last, the first system obtains a fusion sorting recommendation result of the multiple heterogeneous data sources by inputting the unified evaluation index of each heterogeneous data source and the loss quantitative evaluation index to the fusion-strategy model. The first system can align multiple data sources via a value model and conduct a fusion sorting with aid of the fusion-strategy model, which can effectively achieve the global optimal fusion sorting of the multiple heterogeneous data under constraints.

In one implementation, in terms of the obtaining a unified evaluation index of each heterogeneous data source, by processing the multiple heterogeneous data sources through the value-model set, the using unit 602 is further configured to: obtain a value model corresponding to each heterogeneous data source, by inquiring the value-model set, where the value-model set includes a correspondence between data types of heterogeneous data sources and value models; obtain feature parameters required by the value model corresponding to each heterogeneous data source; determine a dedicated predictor associated with the value model corresponding to each heterogeneous data source; obtain the unified evaluation index of each heterogeneous data source, by inputting the feature parameters and the value model of each heterogeneous data source into the dedicated predictor.

In one implementation, the information recommendation system further includes a second system, in terms of the obtaining a loss quantitative evaluation index of the fusion-strategy model, the obtaining unit 601 is further configured to: obtain an estimated prior result of processing a preset recommendation task by the fusion-strategy model; receive an actual posterior result of processing the preset recommendation task by the fusion-strategy model from the second system; determine the loss quantitative evaluation index of the fusion-strategy model according to the estimated prior result and the actual posterior result.

In one implementation, in terms of the obtaining an estimated prior result of processing a preset recommendation task by the fusion-strategy model, the obtaining unit 601 is further configured to: obtain feature parameters required by the fusion-strategy model to process the preset recommendation task; obtain the estimated prior result of processing the preset recommendation task by the fusion-strategy model, by inputting the feature parameters and the fusion-strategy model into a preset predictor.

In one implementation, in terms of the obtaining, by the first system, a fusion sorting recommendation result of the multiple heterogeneous data sources, by inputting the unified evaluation index of each heterogeneous data source and the loss quantitative evaluation index to the fusion-strategy model, the inputting and processing unit 603 is further configured to: generate a sorting set according to the unified evaluation index of each heterogeneous data source, where the sorting set includes multiple data resource sequences, each data resource sequence includes the multiple heterogeneous data sources, and heterogeneous data sources in one data resource sequence has an order different from that of heterogeneous data sources in another data resource sequence; select an optimum sorting from the sorting set as the fusion sorting recommendation result of the multiple heterogeneous data sources under a constraint of the fusion-strategy model.

In one implementation, the information recommendation system further includes a second system, the second system includes a training database and multiple value modules, and the second system is configured to train each value model via training data in the training database to obtain trained value models. The device for processing fusion data 600 further includes a receiving unit and a generating unit.

The receiving unit is configured to receive the trained value models and data types corresponding to the trained value models from the second system.

The generating unit is configured to generate the value-model set according to the trained value models received and the corresponding data types.

It is to be noted that, the device described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

The obtaining unit 601 can be a receiver. The using unit 602 and the input and processing unit 603 may be a processor.

Implementations of the present disclosure also provide a non-transitory computer storage medium. The non-transitory computer storage medium stores computer programs for electronic data interchange which, when executed, are operable with a computer to execute all or part of the operations of any of the methods described in the above-described method implementations. The computer may include a first system.

Implementations of the present disclosure also provide a computer program product. The computer program product includes a non-transitory computer-readable storage medium that stores computer programs. The computer programs are operable with a computer to perform all or part of the operations of any of the methods described in the above method implementations. The computer program product may be a software installation package and the computer may include a first system.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing fusion data, applicable to an information recommendation system, the information recommendation system comprising a value-model set and a fusion-strategy model, the method comprising:
    obtaining a plurality of heterogeneous data sources;
    obtaining a unified evaluation index of each heterogeneous data source of the plurality of heterogeneous data sources by processing the plurality of heterogeneous data sources through the value-model set;
    obtaining a loss quantitative evaluation index of the fusion-strategy model; and
    obtaining a fusion sorting recommendation result of the plurality of heterogeneous data sources by inputting the unified evaluation index of the each heterogeneous data source and the loss quantitative evaluation index to the fusion-strategy model.

2. The method of claim 1, wherein obtaining the unified evaluation index of each heterogeneous data source of the plurality of heterogeneous data sources by processing the plurality of heterogeneous data sources through the value-model set comprises:
    obtaining a value model corresponding to the each heterogeneous data source by inquiring the value-model set, the value-model set comprising a correspondence between data types of heterogeneous data sources and value models;
    obtaining feature parameters required by the value model corresponding to the each heterogeneous data source;
    determining a dedicated predictor associated with the value model corresponding to the each heterogeneous data source; and
    obtaining the unified evaluation index of the each heterogeneous data source by inputting the feature parameters and the value model of the each heterogeneous data source into the dedicated predictor.

3. The method of claim 1, wherein obtaining the loss quantitative evaluation index of the fusion-strategy model comprises:
    obtaining an estimated prior result of processing a preset recommendation task through the fusion-strategy model;
    obtaining an actual posterior result of processing the preset recommendation task by the fusion-strategy model; and
    determining the loss quantitative evaluation index of the fusion-strategy model according to the estimated prior result and the actual posterior result.

4. The method of claim 3, wherein obtaining the estimated prior result of processing the preset recommendation task through the fusion-strategy model comprises:
    obtaining feature parameters required by the fusion-strategy model to process the preset recommendation task; and
    obtaining the estimated prior result of processing the preset recommendation task through the fusion-strategy model, by inputting the feature parameters and the fusion-strategy model into a preset predictor.

5. The method of claim 1, wherein obtaining the fusion sorting recommendation result of the plurality of heterogeneous data sources by inputting the unified evaluation index of the each heterogeneous data source and the loss quantitative evaluation index to the fusion-strategy model comprises:
    generating a sorting set according to the unified evaluation index of the each heterogeneous data source, the sorting set comprising a plurality of data resource sequences, each data resource sequence comprising the plurality of heterogeneous data sources, heterogeneous data sources in one data resource sequence having an order different from that of heterogeneous data sources in another data resource sequence; and
    selecting an optimum sorting from the sorting set as the fusion sorting recommendation result of the plurality of heterogeneous data sources under a constraint of the fusion-strategy model.

6. The method of claim 5, wherein the constraint comprises at least one of the following:
    there is at least one natural result in recommendation results, a number of advertisements is not less than a preset number, recommendation information is not all unpopular information or all popular information, and a ratio of displayed natural results to all data sources in a time period is greater than a preset ratio.

7. The method of claim 1, wherein the information recommendation system further comprises a training database and a plurality of value modules, and the information recommendation system is configured to train each value model via training data in the training database to obtain trained value models, wherein the method further comprises:
    obtaining the trained value models and data types corresponding to the trained value models; and
    generating the value-model set according to the trained value models obtained and the corresponding data types.

8. A system for information recommendation, comprising:
a processor; and
a memory configured to store executable program codes which, when executed, cause the processor to:
obtain a plurality of heterogeneous data sources;
obtain a unified evaluation index of each heterogeneous data source of the plurality of heterogeneous data sources, by processing the plurality of heterogeneous data sources through a value-model set;
obtain a loss quantitative evaluation index of a fusion-strategy model; and
obtain a fusion sorting recommendation result of the plurality of heterogeneous data sources by inputting the unified evaluation index of the each heterogeneous data source and the loss quantitative evaluation index to the fusion-strategy model.

9. The system of claim 8, wherein the executable program codes causing the processor to obtain the unified evaluation index of the each heterogeneous data source by processing the plurality of heterogeneous data sources through the value-model set cause the processor to:
obtain a value model corresponding to the each heterogeneous data source by inquiring the value-model set, the value-model set comprising a correspondence between data types of heterogeneous data sources and value models;
obtain feature parameters required by the value model corresponding to the each heterogeneous data source;
determine a dedicated predictor associated with the value model corresponding to the each heterogeneous data source; and
obtain the unified evaluation index of the each heterogeneous data source by inputting the feature parameters and the value model of the each heterogeneous data source into the dedicated predictor.

10. The system of claim 8, wherein the executable program codes causing the processor to obtain the loss quantitative evaluation index of the fusion-strategy model cause the processor to:
obtain an estimated prior result of processing a preset recommendation task through the fusion-strategy model;
receive an actual posterior result of processing the preset recommendation task by the fusion-strategy model; and
determine the loss quantitative evaluation index of the fusion-strategy model according to the estimated prior result and the actual posterior result.

11. The system of claim 10, wherein the executable program codes causing the processor to obtain the estimated prior result of processing the preset recommendation task through the fusion-strategy model cause the processor to:
obtain feature parameters required by the fusion-strategy model to process the preset recommendation task; and
obtain the estimated prior result of processing the preset recommendation task through the fusion-strategy model, by inputting the feature parameters and the fusion-strategy model into a preset predictor.

12. The system of claim 8, wherein the executable program codes causing the processor to obtain the fusion sorting recommendation result of the plurality of heterogeneous data sources by inputting the unified evaluation index of the each heterogeneous data source and the loss quantitative evaluation index to the fusion-strategy model cause the processor to:
generate a sorting set according to the unified evaluation index of the each heterogeneous data source, the sorting set comprising a plurality of data resource sequences, each data resource sequence comprising the plurality of heterogeneous data sources, heterogeneous data sources in one data resource sequence having an order different from that of heterogeneous data sources in another data resource sequence; and
select an optimum sorting from the sorting set as the fusion sorting recommendation result of the plurality of heterogeneous data sources under a constraint of the fusion-strategy model.

13. The system of claim 12, wherein the constraint comprises at least one of the following: there is at least one natural result in recommendation results, a number of advertisements is not less than a preset number, recommendation information is not all unpopular information or all popular information, and a ratio of displayed natural results to all data sources in a time period is greater than a preset ratio.

14. The system of claim 8, wherein the executable program codes further cause the processor to:
obtaining trained value models and data types corresponding to the trained value models, the system further comprising a training database and a plurality of value modules and the system being configured to train each value model via training data in the training database to obtain the trained value models; and
generate the value-model set according to the trained value models obtained and the corresponding data types.

15. A method for processing fusion data, applicable to an information recommendation system comprising a first system, the first system comprising a value-model set and a fusion-strategy model, the method comprising:
obtaining, by the first system, a plurality of heterogeneous data sources;
obtaining, by the first system, a unified evaluation index of each heterogeneous data source of the plurality of heterogeneous data sources by processing the plurality of heterogeneous data sources through the value-model set;
obtaining, by the first system, a loss quantitative evaluation index of the fusion-strategy model; and
obtaining, by the first system, a fusion sorting recommendation result of the plurality of heterogeneous data sources by inputting the unified evaluation index of the each heterogeneous data source and the loss quantitative evaluation index to the fusion-strategy model.

16. The method of claim 15, wherein obtaining, by the first system, the unified evaluation index of each heterogeneous data source of the plurality of heterogeneous data sources by processing the plurality of heterogeneous data sources through the value-model set comprises:
obtaining, by the first system, a value model corresponding to the each heterogeneous data source by inquiring the value-model set, the value-model set comprising a correspondence between data types of heterogeneous data sources and value models;
obtaining, by the first system, feature parameters required by the value model corresponding to the each heterogeneous data source;
determining, by the first system, a dedicated predictor associated with the value model corresponding to the each heterogeneous data source; and
obtaining, by the first system, the unified evaluation index of the each heterogeneous data source by inputting the feature parameters and the value model of the each heterogeneous data source into the dedicated predictor.

17. The method of claim 15, wherein the information recommendation system further comprises a second system, and obtaining, by the first system, the loss quantitative evaluation index of the fusion-strategy model comprises:

obtaining, by the first system, an estimated prior result of processing a preset recommendation task through the fusion-strategy model;

receiving, by the first system, an actual posterior result of processing the preset recommendation task by the fusion-strategy model from the second system; and determining, by the first system, the loss quantitative evaluation index of the fusion-strategy model according to the estimated prior result and the actual posterior result.

18. The method of claim 17, wherein obtaining, by the first system, the estimated prior result of processing the preset recommendation task through the fusion-strategy model comprises:

obtaining, by the first system, feature parameters required by the fusion-strategy model to process the preset recommendation task; and obtaining, by the first system, the estimated prior result of processing the preset recommendation task through the fusion-strategy model, by inputting the feature parameters and the fusion-strategy model into a preset predictor.

19. The method of claim 15, wherein obtaining, by the first system, the fusion sorting recommendation result of the plurality of heterogeneous data sources by inputting the unified evaluation index of the each heterogeneous data source and the loss quantitative evaluation index to the fusion-strategy model comprises:

generating, by the first system, a sorting set according to the unified evaluation index of the each heterogeneous data source, the sorting set comprising a plurality of data resource sequences, each data resource sequence comprising the plurality of heterogeneous data sources, heterogeneous data sources in one data resource sequence having an order different from that of heterogeneous data sources in another data resource sequence; and selecting, by the first system, an optimum sorting from the sorting set as the fusion sorting recommendation result of the plurality of heterogeneous data sources under a constraint of the fusion-strategy model.

20. The method of claim 15, wherein the information recommendation system further comprises a second system, the second system comprises a training database and a plurality of value modules, and the second system is configured to train each value model via training data in the training database to obtain trained value models, the method further comprising:

receiving, by the first system, the trained value models and data types corresponding to the trained value models from the second system; and generating, by the first system, the value-model set according to the trained value models received and the corresponding data types.

* * * * *